(12) United States Patent
Grosseholz et al.

(10) Patent No.: US 12,012,932 B2
(45) Date of Patent: Jun. 18, 2024

(54) METHOD AND CONTROL SYSTEM FOR OPERATING A WIND FARM (71) Applicant: Nordex Energy SE & Co. KG, Hamburg (DE)

(72) Inventors: Georg Grosseholz, Hamburg (DE); Sören Schröter, Hamburg (DE); Kai Kruppa, Kiebitzreihe (DE); Simon De Rijcke, Mechelen (BE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/054,763

(22) Filed: Nov. 11, 2022

(65) Prior Publication Data
US 2023/0167802 A1    Jun. 1, 2023

(30) Foreign Application Priority Data
Nov. 30, 2021    (EP) .................... 21 211 444

(51) Int. Cl.
*F03D 7/00*    (2006.01)
*F03D 7/02*    (2006.01)
*F03D 7/04*    (2006.01)
*H02J 3/18*    (2006.01)
*H02J 3/38*    (2006.01)
*H02J 3/50*    (2006.01)

(52) U.S. Cl.
CPC .......... *F03D 7/0284* (2013.01); *F03D 7/048* (2013.01); *F05B 2270/1033* (2013.01); *H02J 3/1892* (2013.01); *H02J 3/381* (2013.01); *H02J 3/50* (2013.01); *H02J 2300/28* (2020.01)

(58) Field of Classification Search
CPC ............... F03D 7/0284; F03D 7/048; F05B 2270/1033; H02J 3/1892; H02J 3/381; H02J 3/50; H02J 2300/28; Y02E 10/76
See application file for complete search history.

(56) References Cited

U.S. PATENT DOCUMENTS

| | | | |
|---|---|---|---|
| 10,767,630 B1 * | 9/2020 | Venkitanarayanan | .. F03D 7/028 |
| 2008/0042442 A1 | 2/2008 | Richter et al. | |
| 2015/0137520 A1 | 5/2015 | Garcia | |
| 2015/0249415 A1 | 9/2015 | Babazadeh et al. | |
| 2015/0295529 A1 | 10/2015 | Rose, Jr. et al. | |
| 2019/0277258 A1 | 9/2019 | Feltes et al. | |
| 2020/0392945 A1 | 12/2020 | Grosseholz | |

FOREIGN PATENT DOCUMENTS

| | | | | |
|---|---|---|---|---|
| EP | 1 892 412 A1 | 2/2008 | | |
| EP | 2 221 957 A1 | 8/2010 | | |
| EP | 2221957 A1 * | 8/2010 | ........... | F03D 7/0284 |
| EP | 2 933 478 A1 | 10/2015 | | |
| WO | 2018/099626 A1 | 6/2018 | | |
| WO | 2018/0115431 A1 | 6/2018 | | |

* cited by examiner

*Primary Examiner* — Julio C. Gonzalez
(74) *Attorney, Agent, or Firm* — Walter Ottesen, P.A.

(57) ABSTRACT

This disclosure is directed to a method for operating a wind farm having a plurality of wind turbines and to a control system for a wind farm. The wind farm is connected to an electrical grid. The wind turbines are operated to supply electrical power to the electrical grid in accordance with at least one setpoint value for a power related electrical variable. In the event that an available reactive power of the wind farm is smaller than a setpoint for a reactive power to be supplied by the wind farm, a required increase of reactive power is determined for each wind turbine of the wind farm.

16 Claims, 4 Drawing Sheets

METHOD AND CONTROL SYSTEM FOR OPERATING A WIND FARM

CROSS REFERENCE TO RELATED APPLICATION

This application claims priority of European patent application no. 21 211 444.1, filed Nov. 30, 2021, the entire content of which is incorporated herein by reference.

TECHNICAL FIELD

The present disclosure relates to a method and a control system for operating a wind farm having a plurality of wind turbines.

BACKGROUND

The wind farm includes a plurality of wind turbines. The wind turbines are operated to supply electrical power to a grid in accordance with at least one setpoint value for a power-related electrical variable. The setpoint value can be either determined in the wind farm or received from an external source.

US 2008/0042442 discloses a method for operating a wind turbine power plant with a controllable active power, wherein the active power is reduced when a target reactive power lies outside of a reactive power interval assigned to the current active power.

EP 2 221 957 A1 describes an operation control method for a wind farm. The method includes a step of determining reactive power set values for each turbine. The wind farm defines individual reactive power correction levels for each wind turbine. The reactive power correction levels of the individual wind turbines are corrected based on reactive power setpoint values for the wind farm. Each reactive power correction level depends on the reactive power at the output of the individual wind turbine.

US 2015/0295529 discloses a method for operating a wind farm, the method including determining an available reactive power for each wind turbine and distributing an individual reactive power command to each wind turbine. The individual reactive power command is tailored to each wind turbine based on the available reactive power value for that wind turbine.

US 2019/0277258 describes a method of controlling a power value of an offshore wind energy system using a power factor setpoint value and/or a reactive power setpoint value to define the power setpoint value for the offshore wind energy system. For each wind turbine an active power correction value is determined in accordance with the provided power setpoint value for the offshore wind energy system. The power setpoint value takes the current value of the reactive power of each wind turbine into account. The correction value for the active power setpoint is provided such that at least the setpoint value for the offshore wind system is provided.

WO 2018/115431 A1 refers to a method and a system for controlling an operation of a wind farm connected to a grid. The method minimizes a central voltage deviation in a point of connection between the grid and the wind farm compared to a reference voltage provided by the grid. Furthermore, the method minimizes local voltage deviations compared to local reference voltages for each connection of the wind turbine by calculating sensitivity coefficients for the wind turbines and regulating local power references including an active power reference and a reactive power reference to each of the local controllers. It is further explained that the reactive and active power control are coordinated to improve the VAR capacity of the system.

When looking at the setpoints for active power and reactive power in the wind farm it may become necessary to reduce the active power in order to supply the required reactive power to the grid.

SUMMARY

It is an object of this disclosure to minimize the necessary reduction of active power production due to a high reactive power setpoint during a reactive power-prioritized operation of the wind farm.

This object is, for example, achieved via a method for operating a wind farm comprising a plurality (N) of wind turbines, which are operated to supply electrical power to a grid in accordance with at least one setpoint value for a power related electrical variable. The method includes the steps of:

receiving a setpoint for a reactive power ($Q_{SP,WF}$) to be supplied by the wind farm;

determining a value of an available reactive power ($Q_{avail,WTj}$) of each wind turbine;

determining an available reactive power of the wind farm ($Q_{avail,WF}$) from the sum of the available reactive power of each wind turbine ($Q_{avail,WF}:=\Sigma_{j=1}^{N} Q_{avail,WTj}$);

comparing the available reactive power of the wind farm ($Q_{avail,WF}$) with the received setpoint for the reactive power ($Q_{SP,WF}$) for the wind farm; and, wherein, if the available reactive power of the wind farm ($Q_{avail,WF}$) is smaller than the received setpoint for the reactive power ($Q_{SP,WF}$) for the wind farm:

determining a required increase of the reactive power ($\Delta Q_{WTj}^*$) for at least one of the wind turbines based at least on the available reactive power of the wind farm ($Q_{avail,WF}$) and the setpoint for the reactive power for the wind farm ($Q_{SP,WF}$);

determining a setpoint for the reactive power ($Q_{SP,WTj}$) for each of the at least one of the wind turbines based at least on the available reactive power of said each wind turbine ($Q_{avail,WTj}$) and said required increase of the reactive power ($\Delta Q_{WTj}^*$); and, distributing at least one of the required increase of the reactive power ($\Delta Q_{WTj}^*$) and the setpoint for the reactive power ($Q_{SP,WTj}$) to each of the at least one of the wind turbines.

The method according to this disclosure is suited for operating a wind farm including a plurality of wind turbines. The wind turbines are operated to supply electrical power to a grid in accordance with at least one setpoint value for a power-related electrical variable to the grid. The method includes the step of receiving a setpoint for a reactive power to be supplied by the wind farm. The setpoint for the reactive power can be either received from an external instance, such as a grid control unit of the grid operator, or determined internally at the wind farm. In a further step a value of an available reactive power of each wind turbine taking part in the method is determined. Based on the values of available reactive power for each wind turbine the available reactive power of the wind farm is determined by summing up all the values of available reactive power. In a further step the available reactive power of the wind farm is compared to the present setpoint of the reactive power for the wind farm. It should be noted that this refers to the absolute value of the reactive power. In case the available reactive power of the wind farm is smaller than the received setpoint for the reactive power of the wind farm it becomes necessary to increase the available reactive power and to change a setpoint for an electrical variable related to the active power for at least one of the wind turbines. In this situation it is no longer possible to both comply with the received setpoint for the reactive power for the wind farm and stick to the current value of the active power in the wind farm. In a further step a required increase of the reactive power for at least one of the wind turbines is determined based at least on the available reactive power of the wind farm and the setpoint for the reactive power for the wind farm. A setpoint for the reactive power for each wind turbine is determined based at least on the available reactive power of the respective wind turbine and the required increase of the reactive power for the respective wind turbine. At least one of the required increase of reactive power and the setpoint for the reactive power is distributed to each of the respective wind turbines. The wind turbines are then controlled to produce reactive power in accordance with the setpoint for the reactive power for each wind turbine. They are also controlled to produce active power.

In an embodiment the required increase of the reactive power of the at least one turbine is determined based on the difference of the received setpoint for the reactive power of the wind farm and the available reactive power of the wind farm. This is a required increase of the reactive power at the level of the wind farm. This required increase of reactive power at the wind farm level is broken down to the level of the wind turbines by using a first fraction which assigns to each wind turbine the required increase of the reactive power.

In a further embodiment, the first fraction is determined from a sensitivity of the reactive power to the active power, wherein the first fraction is proportional to the sensitivity. The sensitivity describes the change of reactive power ($\partial Q_j$) when the active power is changed ($\partial P_j$) for the j-th wind turbine:

$$\left| \frac{\partial Q_j}{\partial P_j} \right|$$

By using the sensitivity for the first fraction it becomes possible that, when assigning the required increase of the reactive power, those wind turbines having a greater sensitivity compared to other wind turbines, that is a small change in the active power leads to a large change in reactive power available, contribute more to the reactive power for the wind farm than other wind turbines having a low sensitivity, that is a larger change in the active power is needed for a given change in reactive power. It is important to notice that using the sensitivity reduces the necessary change of active power in the wind farm when complying with the received setpoint of reactive power. It should also be understood that for practical purposes differences may be used in the calculations in place of partial differentials. It should also be noted that the considerations on reactive power and partial differentials refer to absolute values.

In an embodiment the first fraction is determined as $$g_j := \frac{\left| \frac{\partial Q_j}{\partial P_j} \right|^\beta}{\sum_{k=1}^N \left| \frac{\partial Q_k}{\partial P_k} \right|^\beta}$$

wherein $\beta$ is a given value of a first parameter, preferably $\beta > 0$.

The value of the first parameter $\beta$ is used as an exponent and allows to give different weight to the sensitivity. It should be noted that if the parameter $\beta$ approaches 0 the first fraction $g_j$ approaches an equal distribution in which the sensitivity is no longer considered.

Based on the required increase of the reactive power the setpoint for the reactive power of each wind turbine is determined from the sum of the available reactive power of the respective wind turbine and the required increase of the reactive power for that wind turbine. Using this step for each wind turbine, a setpoint of reactive power is assigned. Based on the setpoints for the reactive power new setpoints for the active power are set for each of the wind turbines.

If the available reactive power of the wind farm is greater than the received setpoint for the reactive power for the wind farm it is not necessary to determine a required increase of reactive power. In an embodiment the setpoint for the reactive power for each wind turbine is then determined as a second fraction of the received setpoint for the reactive power for the wind farm. In an embodiment the second fraction is described as $$f_j := \frac{\alpha}{N} + \frac{(1-\alpha)Y_j}{\sum_{i=1}^N Y_i}$$

In this equation $\alpha$ is a given value of a second parameter and $Y_i$ describes the conductivity of a power cable connection of the i-th wind turbine to a point of common coupling for the wind farm to the grid. The second fraction is a sum of two sub-fractions. The first sub-fraction $\alpha/N$ describes an equal distribution in which every wind turbine in the wind farm gets assigned the same fraction of the received setpoint of the reactive power. The second sub-fraction is proportional to the conductivity of the power cable connecting the wind turbine to a point of a common coupling. This means that a good conductivity with a high value of Y leads to a greater share of the received setpoint for the reactive power in the wind farm. By assigning a greater fraction of reactive power to wind turbines having a better conductivity within the wind farm compared to other wind turbines, the loss of reactive power is reduced and the respective wind turbines contribute to the overall reactive power of the wind farm with a greater share. The second parameter $\alpha$ can be used to change the weight of an equal distribution and a distribution by conductivity relative to each other: If $\alpha$ is set to 1 the fraction of all wind turbines will be equal; if $\alpha$ is set to 0 the fraction of each wind turbine will be dependent on the conductivity only; any other value of a will create a fraction $f_j$ that has both an equal part and a part determined from conductivity.

In an embodiment the setpoint for the reactive power for each wind turbine is limited to a maximum available reactive power of the respective wind turbine. This limiting may lead to some of the desired reactive power not being assigned to a wind turbine. This unassigned desired reactive power is then assigned to other wind turbines using the same calculations as described above and executing the method of this disclosure recursively, only including those wind turbines that still have available reactive power. It should be noted that reactive power means the absolute value and can refer to capacitive reactive power or inductive reactive power.

In an embodiment the method includes changing a setpoint for an electrical value related to an active power for at least one of the wind turbines. This setpoint is determined based on at least one of a current minimum active power, a current active power, and a maximum available active power of the respective wind turbine. This setpoint is determined in such a way that the available reactive power of the respective wind turbine is changed and the wind turbine is able to supply both active and reactive power in accordance with the respective setpoints, thus contributing to the active and reactive power supplied by the wind farm.

In an embodiment the setpoint for the electrical value related to active power is changed such that the active power is reduced, such that the available reactive power of the respective wind turbine is increased. At the same time, it is ensured that the active power setpoint does not fall below the current minimum active power of the wind turbine. The current minimum active power may be a design value or, preferably, it may depend on current operating conditions of the wind turbine.

The aforementioned object can, for example, also be achieved by a control system for a wind farm having a plurality (N) of wind turbines, which are operated to supply electrical power to a grid in accordance with at least one setpoint value for a power related electrical variable. The control system includes:

a plurality of wind turbine controllers, wherein each of the plurality of wind turbines has one of said plurality of wind turbine controllers assigned thereto;

a plurality of sensors units wherein each of the plurality of wind turbines has at least one of said plurality of sensor units assigned thereto;

a wind farm controller superordinate to said plurality of wind turbine controllers;

the control system being configured to:

receive a setpoint for a reactive power ($Q_{SP,WF}$) to be supplied by the wind farm;

determine a quantity that relates to an operating condition of each of said plurality of wind turbines by sensor measurement;

determine a value of an available reactive power ($Q_{avail,WTj}$) of each of said plurality of wind turbines based on said quantity;

determine an available reactive power of the wind farm ($Q_{avail,WF}$) from the sum of the available reactive power of each wind turbine ($Q_{avail,WF} := \Sigma_{j=1}^{N} Q_{avail,WTj}$)

compare the available reactive power of the wind farm ($Q_{avail,WF}$) with the received setpoint for the reactive power ($Q_{SP,WF}$) for the wind farm; and, wherein if the available reactive power of the wind farm ($Q_{avail,WF}$) is smaller than the received setpoint for the reactive power ($Q_{SP,WF}$) for the wind farm, the control system is further configured to determine a required increase of the reactive power ($\Delta Q_{WTj}^*$) for at least one of the plurality of wind turbines based at least on the available reactive power of the wind farm ($Q_{avail,WF}$) and the setpoint for the reactive power for the wind farm ($Q_{SP,WF}$);

determine a setpoint for the reactive power ($Q_{SP,WTj}$) for each of the at least one of the wind turbines based at least on the available reactive power of said each wind turbine ($Q_{avail,WTj}$) and said required increase of the reactive power ($\Delta Q_{WTj}^*$); and, distribute at least one of the required increase of the reactive power ($\Delta Q_{WTj}^*$) and the setpoint for the reactive power ($Q_{SP,WTj}$) to each wind turbine controller of the at least one of the wind turbines.

A control system according to the disclosure is suitable and adapted for a wind farm including a plurality of wind turbines. The wind turbines are operated to supply electrical power to a grid in accordance with at least one setpoint value for a power-related electrical variable. The control system includes a wind turbine controller for each of the plurality of wind turbines, at least one sensor unit for each of the wind turbines, and a wind farm controller superordinate to the wind turbine controllers. The control system is configured to receive a setpoint for a reactive power to be supplied to the grid by the wind farm. Receiving a setpoint may include calculating the setpoint for a reactive power by a module internal to the wind farm or receiving the setpoint value from an external source, such as a grid control unit of the grid operator. The control system is further configured to determine a quantity relating to an operating condition of each wind turbine by sensor measurement. This quantity may, by way of example, be related to a temperature, a wind speed, a voltage, an electrical current, a generator torque, or a rotational speed of the generator. Based on this quantity, the control system is configured to determine a value of an available reactive power of each wind turbine. Based on this available reactive power of each wind turbine an available reactive power of the wind farm is determined from the sum of the available reactive power of each wind turbine. The available reactive power of the wind farm is compared with the received setpoint for the reactive power of the wind farm. If the available reactive power of the wind farm is smaller than the received setpoint for the reactive power for the wind farm the control system is configured to determine a required increase of the reactive power for at least one of the wind turbines based at least on the available power of the wind farm and the setpoint for the reactive power for the wind farm. Furthermore, the control system is configured to determine a setpoint for the reactive power for each wind turbine based at least on the available reactive power of the respective wind turbine and on the required increase of reactive power for the respective wind turbine. The control system therefore provides for each wind turbine a setpoint for the reactive power of each wind turbine such that the wind farm can provide reactive power in accordance with the received setpoint for reactive power. The control system is further configured to distribute at least one of the required increase of reactive power and the setpoint for the reactive power to each wind turbine controller. It should be understood that the order of the steps described above may be changed in any sensible way depending on which controller, that is, wind farm controller or wind turbine controller, is configured to perform a particular step.

In an embodiment each wind turbine controller is configured to determine the quantity relating to an operating condition of the respective wind turbine by sensor measurement and to determine the available reactive power of the respective wind turbine based on this measured quantity. The wind turbine controller may further be configured to determine the available active power of the respective wind turbine. Determining the available active and reactive power may, by way of example, be based on at least one of an actual apparent power of the wind turbine, a maximum available apparent power of the wind turbine, a current actual active power of the wind turbine, a minimum available active power of the wind turbine, a maximum active power of the wind turbine, a voltage present in an electrical system of the wind turbine, an electrical current present in the electrical system of the wind turbine, a maximum permitted electrical current in the electrical system of the wind turbine, an actual temperature present in a the electrical system of the wind turbine, a maximum permitted temperature in the electrical system of the wind turbine, an ambient temperature at the wind turbine, a rotational speed of a generator of the wind turbine, a generator torque, a switching frequency of electronic switches in the electrical system of the wind turbine, a maximum cooling capacity available to the wind turbine, and a wind speed at the wind turbine. Each of such quantities alone or in combination with other quantities may be limiting to the available active power and the available reactive power of each wind turbine in the wind farm.

In an embodiment the wind farm controller is configured to receive the setpoint for the reactive power for the wind farm, to determine the available reactive power of the wind farm from the sum of the available reactive power of each wind turbine, to compare the available reactive power of the wind farm with the received setpoint for the reactive power, to determine the required increase of the reactive power of each wind turbine, and to distribute at least one of the required increase of reactive power and the setpoint for the reactive power to each wind turbine controller.

In an embodiment the wind farm controller is further configured to perform the step of determining the setpoint for the reactive power for each of the wind turbines based on the available reactive power and the required increase of reactive power for the respective wind turbine. In an alternative embodiment each wind farm controller may be configured to perform the step of determining the setpoint for the reactive power based on the available reactive power and the required increase of reactive power for the respective wind turbine.

BRIEF DESCRIPTION OF THE DRAWINGS

The invention will now be described with reference to the drawings wherein.

DESCRIPTION OF THE PREFERRED EMBODIMENTS

Figure 1:
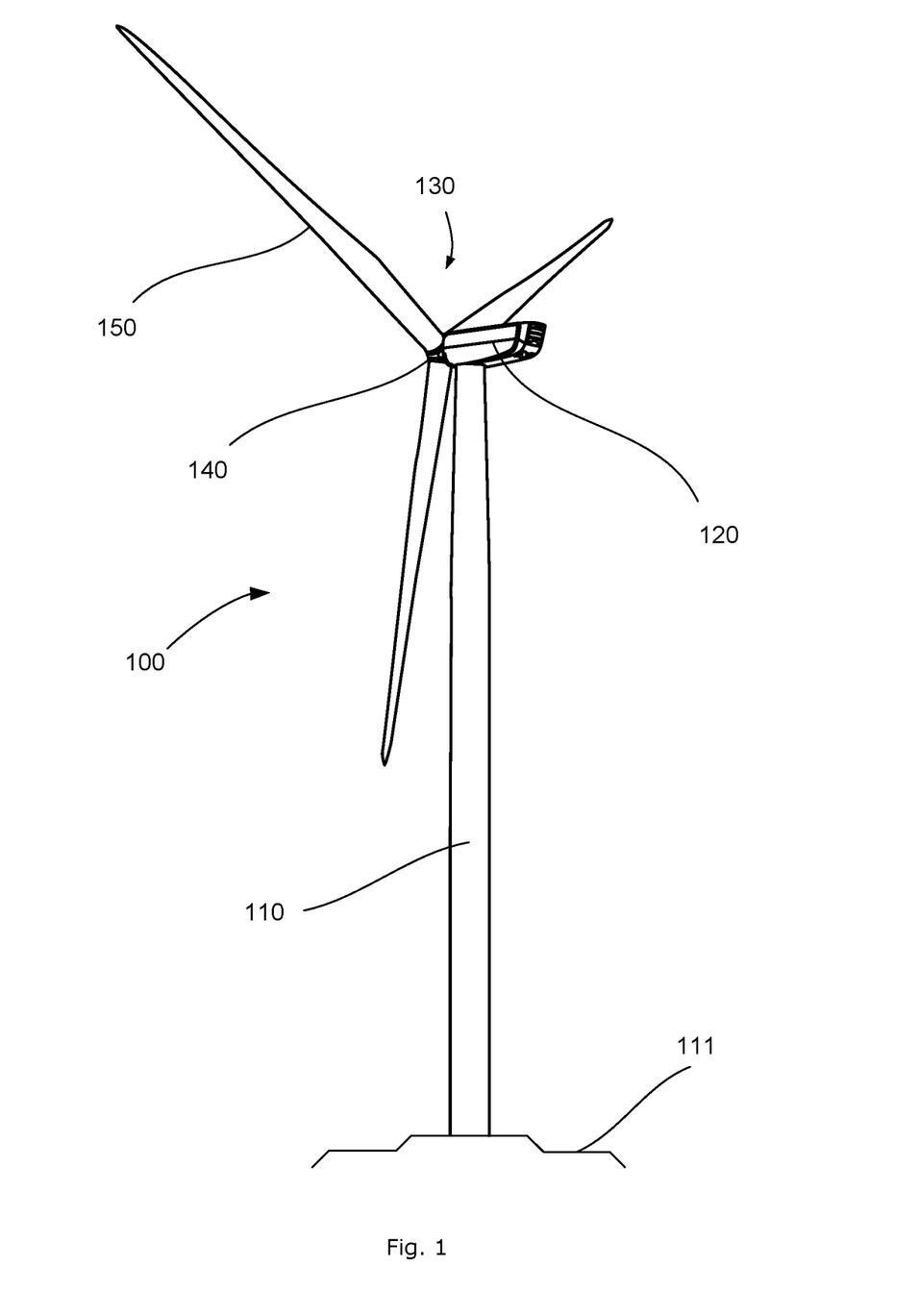
FIG. 1 shows a wind turbine.

FIG. 1 shows a wind turbine 100 that has a tower 110, a nacelle 120, and a rotor 130. The rotor 130 is rotatably mounted on the nacelle 120 and includes a rotor hub 140 and rotor blades 150. The wind turbine 100 is arranged on a foundation 111. The wind turbine 100 may in particular be part of a wind farm 200 as shown in FIG. 2.

Figure 2:
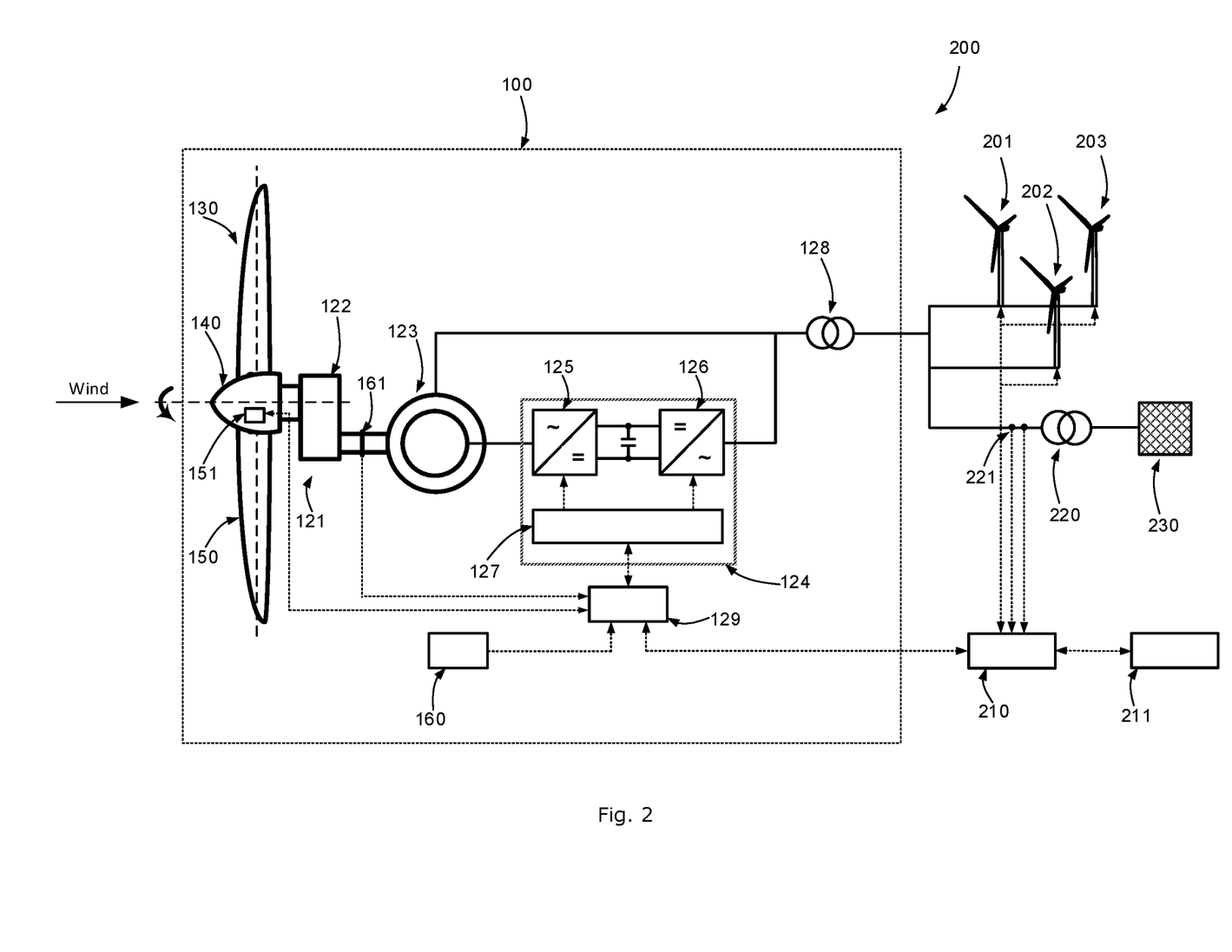
FIG. 2 shows a schematic diagram of a wind turbine in a wind farm.

FIG. 2 shows a schematic diagram of a wind turbine 100, which is part of a wind farm 200 that also includes other wind turbines 201, 202, 203. The wind turbines 100, 201, 202, 203 are connected to a three-phase transmission grid 230 via a wind farm-internal three-phase electrical grid and a substation 220. The substation 220 may include a transformer configured to transform power supplied by the wind turbines in the wind farm 200 from a medium voltage in the wind farm-internal grid to a high voltage in the transmission grid 230. Each of the wind turbines 100, 201, 202, 203 may also be equipped with a transformer 128 connecting it to the wind farm-internal grid.

The rotor 130 of wind turbine 100 absorbs a torque from the wind and transfers this torque via a drive train 121, which may include a transmission 122, to a rotor of a generator 123, which is configured to convert the mechanical power from the torque to electrical power. The generator 123 may be a doubly-fed induction generator as shown in FIG. 2. The stator of the generator 123 is connected to the three-phase grid via the transformer 128 and the rotor of the generator 123 is connected to a converter 124. The grid side of the converter 124 is also connected to the three-phase grid via the transformer 128. For better clarity all three-phase electrical connections are shown as single lines in the schematic view of FIG. 2. It should be appreciated that the method of this disclosure may also be used in connection with wind turbines using other types of generators.

The converter 124 includes a rotor-side converter 125 and a grid-side converter 126 connected by a DC-link. A converter controller 127 is configured to control the rotor-side converter 125 and the grid-side converter 126. For this purpose, the converter controller 127 may set control variables, such as an active and reactive power setpoint, a generator toque, or a rotor current setpoint for the rotor-side converter 125. Corresponding control methods are known from the prior art. The rotor-side converter 125 may use power-electronic switches, such as insulated-gate bipolar transistors, IGBT, to set the rotor current and thus the generator torque. The converter controller 127 receives setpoint values, such as a desired active and reactive power, from a wind turbine controller 129.

A rotational speed sensor 161 may be provided at the drive train 121, for example on a transmission output shaft that is connected to the rotor of the generator 123. Rotational speed values measured by the rotational speed sensor 161 are present at the wind turbine controller 129. Wind speed and direction readings measured by wind sensors 160 are also present at the wind turbine controller 129.

The wind turbine controller 129 is also connected to a pitch system 151 by way of which a pitch angle of the rotor blades 150 can be controlled. The wind turbine controller 129 generally serves to control the wind turbine 100 during operation. Various control methods for variable-speed wind turbines, such as the one of this embodiment, are known from the prior art. The wind turbine controller 129 also communicates with a wind farm controller 210 via a data connection in order to receive control signals and commands and to transmit operational data.

The wind farm controller 210 is also connected via data connections to the other wind turbines 201, 202, 203. It may be connected to a sensor 221, which is configured to measure electrical variables at the point of common coupling of the wind farm 200 with the transmission grid 230. The measured variables of the sensor 221, such as the active and reactive power produced by the wind farm, current values or the grid voltage, may be present as input variables at the wind farm controller 210. The wind farm controller 210 may also be connected via a data connection to an external control unit 211, which may be operated by the operator of the transmission grid 230. The wind farm controller 210 may be configured to receive control signals, setpoint values, and commands from the external control unit 211 and to transmit operational data of the wind farm 200, such as a currently available active and reactive power, to the external control unit 211 at regular intervals, such as every 10 seconds. The wind farm controller 210 may in particular be configured to implement the method of this disclosure.

The external control unit 211 may be configured to transmit setpoint values to the wind farm controller 210, such as a desired active or reactive power production.

Figure 3:
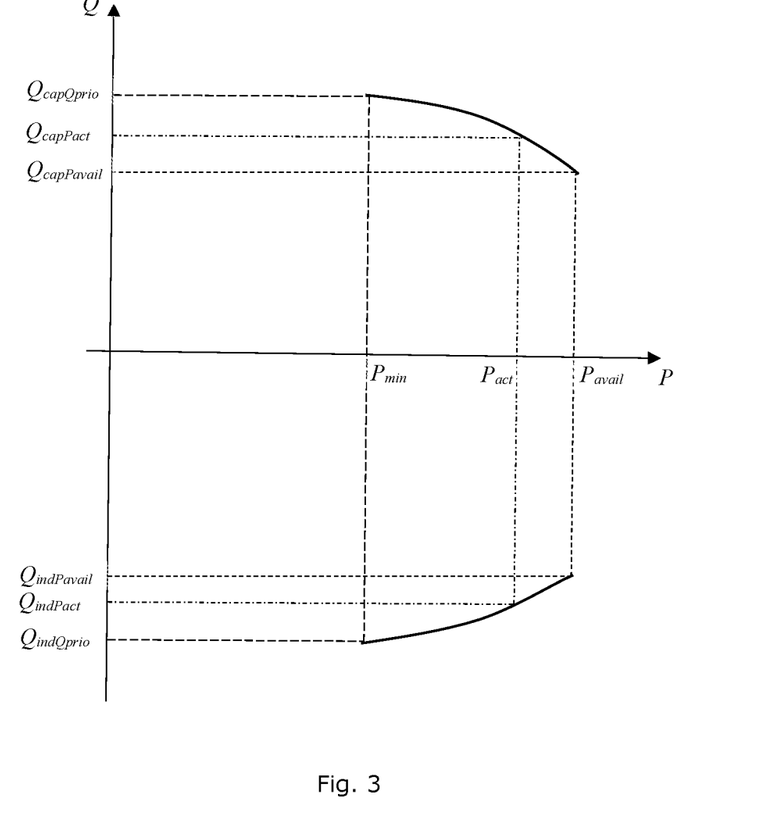
FIG. 3 shows a schematic diagram of active and reactive power values; and,
FIG. 4 shows a flow diagram of the method of this disclosure.

FIG. 3 shows the relationships between various active and reactive power values in a wind turbine in a schematic diagram. The diagram shows the active power P on the horizontal axis and the reactive power Q on the vertical axis. A reactive power Q above the horizontal axis may be understood as capacitive reactive power and a reactive power below the horizontal axis may be understood as inductive reactive power. With a given actual active power, $P_{act}$, the wind turbine is able to produce reactive power in the range between a first value, $Q_{indPact}$, which is an available inductive reactive power, and a second value, $Q_{capPact}$, which is an available capacitive reactive power.

In an operating mode where active power is prioritized over reactive power and depending on the wind conditions, the wind turbine may be able to produce up to a maximum available active power, $P_{avail}$. However, at that operating point the wind turbine would only be able to produce reactive power ranging from $Q_{indPavail}$ to $Q_{capPavail}$, which may be a smaller range compared to the range above.

In an operating mode where reactive power is prioritized over active power, the wind turbine may be able to produce reactive power in a bigger range, but at the expense of active power. Inductive reactive power may be produced up to $Q_{indQprio}$, however, only a minimum active power, $P_{min}$, can be produced at that operating point. Likewise, capacitive reactive power may be produced up to $Q_{capQprio}$, however, only a minimum active power, $P_{min}$, can be produced at this operating point. These operating points may also be at operating limits beyond which the wind turbine may be unable to operate, which means it would have to be shut down.

It should be noted that the diagram in FIG. 3 shows a simplified presentation and that the relationships between the various active and reactive power values may be non-linear. The points may also shift depending on wind conditions and other operating conditions of the wind turbine.

The wind turbine controller may be configured to determine some or all of these values and to transmit the determined values to the wind farm controller, which will then take these values into account in the method of this disclosure. The wind turbine controller may be configured to at least transmit the available reactive power under the current operating conditions and the available reactive power at the operating point with minimum active power.

Figure 4:
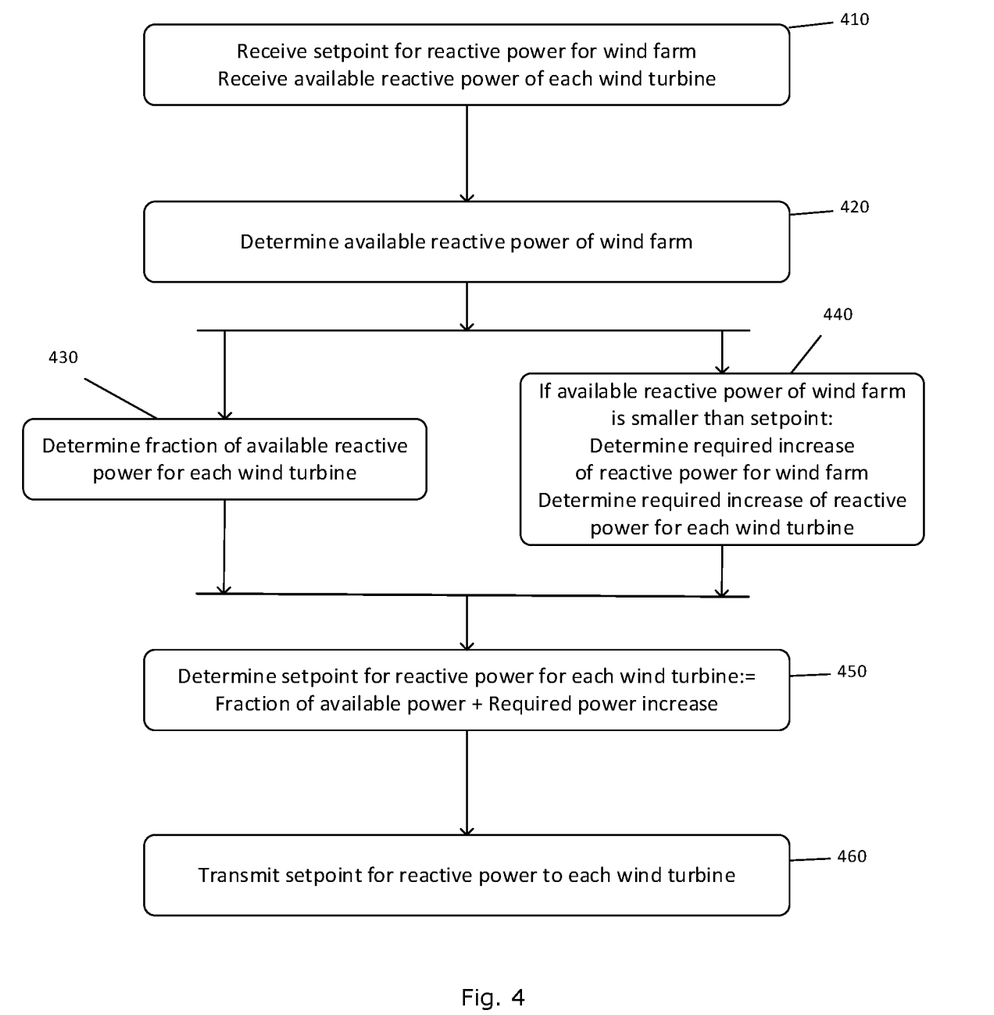

FIG. 4 shows a flow diagram of an embodiment of the method of this disclosure. In step 410 input variables for the method are received, in particular these are the setpoint for the reactive power for the wind farm and the available reactive power of each wind turbine. The reactive power setpoint for the wind farm may be received from a control unit external to the wind farm, such as an operating unit of the transmission grid operator. The reactive power setpoint may also be determined by a control internal to the wind farm that, by way of example, operates based on a voltage measured at the point of common coupling of the wind farm with the transmission grid. The available power of each wind turbine is received by the wind farm controller from the individual wind turbine controllers. It may in particular include at least the available reactive power of each wind turbine under its current operating conditions and the reactive power available at the operating point where each wind turbine produces its individual minimum active power.

Step 420 is to determine the available reactive power of the wind farm from the available reactive power of all wind turbines under the current operating conditions received in step 410:

$$Q_{avail,WF} := \Sigma_{j=1}^{N} Q_{avail,WTj}$$

Step 430 is to determine the share or fraction of the available reactive power for each wind turbine. This may be done using a second fraction, $f_j$:

$$Q^*_{avail,WTj} := f_j Q_{avail,WF}$$

$$f_j := \frac{\alpha}{N} + \frac{(1-\alpha)Y_j}{\sum_{i=1}^{N} Y_i}$$

wherein $\alpha$ is a given value of a parameter and $Y_i$ describes the conductivity of a power cable connection of the i-th wind turbine to a point of common coupling for the wind farm to the grid. The second fraction is a sum of two sub-fractions. The first sub-fraction $\alpha/N$ describes an equal distribution in which every wind turbine in the wind farm gets assigned the same fraction of the received setpoint of the reactive power. The second sub-fraction is proportional to the conductivity of the power cable connecting the wind turbine to a point of a common coupling. This means that a good conductivity with a high value of $Y_j$ leads to a greater share of the received setpoint for the reactive power in the wind farm. By assigning a greater fraction of reactive power to wind turbines having a good conductivity within the wind farm the loss of reactive power is reduced and the wind turbine contributes to the overall reactive power of the wind farm with a greater share. The second parameter $\alpha$ can be used to change the weight of an equal distribution and a distribution by conductivity relative to each other: If $\alpha$ is set to one the fraction of all wind turbines will be equal:

$$f_j := \frac{1}{N}$$

If $\alpha$ is set to zero the fraction of each wind turbine will be dependent on the conductivity only:

$$f_j := \frac{Y_j}{\sum_{i=1}^{N} Y_i}$$

Any other value of a will create a fraction f that has both an equal part and a part determined from conductivity.

Simply using the equation above to assign a reactive power setpoint to each wind turbine may lead to setpoints that are beyond the operating limits of some of the wind turbines. In such a case the setpoint for such wind turbine is limited to the current operating limit of that wind turbine and the calculation is repeated in an iteration, this time only taking into account the unassigned share of reactive power and the remaining wind turbines where there is still a capacity of available reactive power before their operating limits are reached. This iteration may repeat a number of times until a setpoint reactive power for each wind turbine has been determined that does not exceed any operating limits.

If the available reactive power of the wind farm is smaller than the setpoint for the reactive power for the wind farm received in step 410 it may be more efficient to assign to each wind turbine its currently available reactive power. The iterative algorithm described above would arrive at the same result.

Step 440 is to determine a required increase of reactive power for the wind farm and a share or fraction of this required increase for each wind turbine if such increase is required, that is if the available reactive power of the wind farm is smaller than the setpoint for the reactive power received in step 410. This may be done using a first fraction, $g_j$, which assigns to each wind turbine a required increase of reactive power in order to contribute to the required increase of reactive power for the whole wind farm:

$$\Delta Q_{WTj}^* := g_j(Q_{SP,WF} - Q_{avail,WF})$$

wherein $\Delta Q_{WTj}^*$ is the required increase of reactive power for the wind turbine with index j and $(Q_{SP,WF} - Q_{avail,WF})$ is the required increase for the whole wind farm.

The first fraction $g_j$ is determined from a sensitivity of the reactive power to the active power. The sensitivity describes the change of reactive power, $\partial Q_j$, when the active power is changed, $\partial P_j$, for the j-th wind turbine:

$$\left|\frac{\partial Q_j}{\partial P_j}\right|$$

In this way those wind turbines that have a greater sensitivity, that is a small change in the active power allows a large change in reactive power compared to other wind turbines, may contribute more to the required increase of reactive power for the wind farm than other wind turbines having a lower sensitivity, that is a larger change in the active power is needed for a given change in reactive power. Thus, using the sensitivity reduces the loss of active power incurred in the wind farm when providing the required increase of reactive power that is needed to comply with the reactive power setpoint received in step 410.

In an embodiment of this disclosure the first fraction is determined as:

$$g_j := \frac{\left|\frac{\partial Q_j}{\partial P_j}\right|^\beta}{\sum_{k=1}^{N}\left|\frac{\partial Q_k}{\partial P_k}\right|^\beta}$$

wherein $\beta$ is a given value of a first parameter, preferably $\beta > 0$.

The value of the first parameter $\beta$ is used as an exponent and allows to give different weight to the sensitivity. It should be noted that if the parameter $\beta$ approaches 0 the first fraction $g_j$ approaches an equal distribution in which the sensitivity is no longer considered.

As the partial derivative in the equation above may be difficult to determine simple differences may also be used in the calculation.

Simply using the equation above to assign a required increase of reactive power to each wind turbine may lead to setpoints that are beyond the operating limits of some of the wind turbines. In such a case the setpoint for such wind turbine is limited to the current operating limit of that wind turbine and the calculation is repeated in an iteration, this time only taking into account the unassigned share of the required increase of reactive power and the remaining wind turbines where there is still a capacity of reactive power increase before their operating limits are reached. This iteration may repeat a number of times until a setpoint for the required increase of reactive power for each wind turbine has been determined that does not exceed any operating limits.

If the available reactive power of the wind farm is equal to or greater than the setpoint for the reactive power for the wind farm received in step 410 it may be quicker and more efficient to assign zero as the required increase of reactive power in step 440. The iterative algorithm described above would arrive at the same result.

In step 450 a setpoint for the reactive power is determined for each wind turbine as the sum of its fraction of the available reactive power determined in step 430 and its fraction of the required increase of reactive power determined in step 440.

$$Q_{SP,WTj} := Q_{avail,WTj}^* + Q_{WTj}^*$$

This individual setpoint for the reactive power for each wind turbine gets transmitted to the individual wind turbine controllers in step 460. The individual wind turbines will then control active and reactive power production, if necessary changing active power, such that the available reactive power of the individual wind turbines and thus of the wind farm is increased.

The method described above may be repeated at regular intervals, such as every 10 milliseconds or 100 milliseconds or any other suitable interval. With each repeat of the method the wind farm will be able to approach the reactive power setpoint for the wind farm in a quick and smooth manner and react to changing operating conditions.

It should be noted that there may be wind turbines in a wind farm that do not take part in the method described above. In such a case the method obviously only applies to those wind turbines that take part in the method of this disclosure.

It is understood that the foregoing description is that of the preferred embodiments of the invention and that various changes and modifications may be made thereto without departing from the spirit and scope of the invention as defined in the appended claims.

LIST OF REFERENCE NUMERALS

100 wind turbine
110 tower
111 foundation
120 nacelle
121 drive train
122 transmission
123 generator
124 converter
125 rotor-side converter
126 grid-side converter
127 converter controller
128 transformer
129 wind turbine controller
130 rotor
140 rotor hub
150 rotor blades
151 pitch system
160 wind sensors
161 rotational speed sensor
200 wind farm
201, 202, 203 wind turbines 210 wind farm controller
211 external control unit
220 substation
221 sensor for electrical variables
230 transmission grid
410 . . . 460 method steps

What is claimed is:

1. A method for operating a wind farm comprising a plurality (N) of wind turbines, which are operated to supply electrical power to a grid in accordance with at least one setpoint value for a power related electrical variable, the method comprising the steps of:
   receiving a setpoint for a reactive power ($Q_{SP,WF}$) to be supplied by the wind farm;
   determining a value of an available reactive power ($Q_{avail,WF}$) of each wind turbine;
   determining an available reactive power of the wind farm ($Q_{avail,WF}$) from the sum of the available reactive power of each wind turbine ($Q_{avail,WF} := \Sigma_{j=1}^{N} Q_{avail,WTj}$);
   comparing the available reactive power of the wind farm ($Q_{avail,WF}$) with the received setpoint for the reactive power ($Q_{SP,WF}$) for the wind farm; and,
   wherein, if the available reactive power of the wind farm ($Q_{avail,WF}$) is smaller than the received setpoint for the reactive power ($Q_{SP,WF}$) for the wind farm:
      determining a required increase of the reactive power ($\Delta Q_{WTj}^*$) for at least one of the wind turbines based at least on the available reactive power of the wind farm ($Q_{avail,WF}$) and the setpoint for the reactive power for the wind farm ($Q_{SP,WF}$),
         wherein the required increase of reactive power ($\Delta Q_{WTj}^*$) of the at least one wind turbine is determined as a first fraction ($g_j$) of a difference of the setpoint for the reactive power ($Q_{SP,WF}$) for the wind farm and the available reactive power of the wind farm ($Q_{avail,WF}$):

$$\Delta Q_{WTj}^* := g_j(Q_{SP,WF} - Q_{avail,WF}),$$

wherein the first fraction ($g_j$) is determined from a sensitivity of the reactive power ($Q_j$) to the active power ($P_j$), wherein the first fraction ($g_j$) is proportional to the sensitivity;
   determining a setpoint for the reactive power ($Q_{SP,WTj}$) for each of the at least one of the wind turbines based at least on the available reactive power of said each wind turbine ($Q_{avail,WTj}$) and said required increase of the reactive power ($\Delta Q_{WTj}^*$); and,
   distributing at least one of the required increase of the reactive power ($\Delta Q_{WTj}^*$) and the setpoint for the reactive power ($Q_{SP,WTj}$) to each of the at least one of the wind turbines.

2. The method of claim 1, wherein the first fraction ($g_j$) is determined as:

$$g_j := \frac{\left|\frac{\partial Q_j}{\partial P_j}\right|^\beta}{\sum_{k=1}^{N} \left|\frac{\partial Q_k}{\partial P_k}\right|^\beta}$$

wherein $\beta$ is a given value of a first parameter.

3. The method of claim 1, wherein the setpoint for the reactive power for each wind turbine ($Q_{SP,WTj}$) is determined from the sum of the available reactive power of the wind turbine ($Q_{avail,WTj}$) and the required increase of the available reactive power ($\Delta Q_{WTj}^*$) of the wind turbine.

4. The method of claim 1, wherein if the available reactive power of the wind farm ($Q_{avail,WF}$) is greater than the received setpoint for the reactive power ($Q_{SP,WF}$) for the wind farm, the method further comprises:
   determining the setpoint for the reactive power for each wind turbine ($Q_{SP,WTj}$) as a second fraction ($f_j$) of the received setpoint for the reactive power for the wind farm ($Q_{SP,WF}$); and,
   distributing the setpoint for the reactive power ($Q_{SP,WTj}$) to each of the at least one of the wind turbines.

5. The method of claim 4, wherein the second fraction ($f_j$) is defined as:

$$f_j := \frac{\alpha}{N} + \frac{(1-\alpha)Y_j}{\sum_{i=1}^{N} Y_i}$$

wherein $\alpha$ is a given value of a second parameter and $Y_i$ describes a conductivity of a power cable connection of the i-th wind turbine to a point of common coupling of the wind farm to the grid.

6. The method of claim 1, wherein said setpoint for the reactive power for each wind turbine ($Q_{SP,WTj}$) is limited to a maximum available reactive power of each wind turbine ($Q_{capQprio,WTj}$, $Q_{indQprio,WTj}$).

7. The method of claim 1 further comprising changing a setpoint for an electrical value related to an active power ($P_{SP,WTj}$) for said at least one of the wind turbines, based on at least one of a minimum active power ($P_{min,WTj}$), a current active power ($P_{act,WTj}$) and a maximum available active power ($P_{avail,WTj}$) of the at least one wind turbine, such that the available reactive power ($Q_{avail,WTj}$) of the at least one wind turbine is changed.

8. The method of claim 7, wherein said changing the setpoint for the electrical value related to the active power ($P_{SP,WTj}$) for said at least one wind turbine includes reducing said setpoint while ensuring that said setpoint does not fall below the minimum active power of the wind turbine ($P_{min,WTj}$), such that the available reactive power ($Q_{avail,WTj}$) of the at least one wind turbine is increased.

9. A control system for a wind farm having a plurality (N) of wind turbines, which are operated to supply electrical power to a grid in accordance with at least one setpoint value for a power related electrical variable, the control system comprising:
   a plurality of wind turbine controllers, wherein each of the plurality of wind turbines has one of said plurality of wind turbine controllers assigned thereto;
   a plurality of sensors units wherein each of the plurality of wind turbines has at least one of said plurality of sensor units assigned thereto;
   a wind farm controller superordinate to said plurality of wind turbine controllers;
   the control system being configured to:
      receive a setpoint for a reactive power ($Q_{SP,WF}$) to be supplied by the wind farm;
      determine a quantity that relates to an operating condition of each of said plurality of wind turbines by sensor measurement;
      determine a value of an available reactive power ($Q_{avail,WTj}$) of each of said plurality of wind turbines based on said quantity;

determine an available reactive power of the wind farm ($Q_{avail,WF}$) from the sum of the available reactive power of each wind turbine ($Q_{avail,WF}:=\Sigma_{j=1}^{N} Q_{avail,WTj}$);

compare the available reactive power of the wind farm ($Q_{avail,WF}$) with the received setpoint for the reactive power ($Q_{SP,WF}$) for the wind farm; and, wherein if the available reactive power of the wind farm ($Q_{avail,WF}$) is smaller than the received setpoint for the reactive power ($Q_{SP,WF}$) for the wind farm, the control system is further configured to determine a required increase of the reactive power ($\Delta Q_{WTj}^{*}$) for at least one of the plurality of wind turbines based at least on the available reactive power of the wind farm ($Q_{avail,WF}$) and the setpoint for the reactive power for the wind farm ($Q_{SP,WF}$), wherein the required increase of reactive power ($\Delta Q_{WTj}^{*}$) of the at least one wind turbine is determined as a first fraction ($g_j$) of a difference of the setpoint for the reactive power ($Q_{SP,WF}$) for the wind farm and the available reactive power of the wind farm ($Q_{avail,WF}$):

$$\Delta Q_{WTj}^{*}:=g_j(Q_{SP,WF}-Q_{avail,WF}),$$

wherein the first fraction ($g_j$) is determined from a sensitivity of the reactive power ($Q_j$) to the active power ($P_j$), wherein the first fraction ($g_j$) is proportional to the sensitivity;

determine a setpoint for the reactive power ($Q_{SP,WTj}$) for each of the at least one of the wind turbines based at least on the available reactive power of said each wind turbine ($Q_{avail,WTj}$) and said required increase of the reactive power ($\Delta Q_{WTj}^{*}$); and, distribute at least one of the required increase of the reactive power ($\Delta Q_{WTj}^{*}$) and the setpoint for the reactive power ($Q_{SP,WTj}$) to each wind turbine controller of the at least one of the wind turbines.

10. The control system of claim 9, wherein each wind turbine controller is further configured to:

determine the quantity that relates to an operating condition of the respective wind turbine by sensor measurement, and determine the value of the available reactive power ($Q_{avail,WTj}$) of the respective wind turbine based on said quantity.

11. The control system of claim 9, wherein:

said receiving the setpoint for the reactive power ($Q_{SP,WF}$) to be supplied by the wind farm is performed by said wind farm controller, said determining the available reactive power of the wind farm ($Q_{avail,WF}$) from the sum of the available reactive power of each wind turbine ($Q_{avail,WF}:=\Sigma_{j=1}^{N} Q_{avail,WTj}$) is performed by said wind farm controller, said comparing the available reactive power of the wind farm ($Q_{avail,WF}$) with the received setpoint for the reactive power ($Q_{SP,WF}$) for the wind farm is performed by said wind farm controller, said determining the required increase of the reactive power ($\Delta Q_{WTj}^{*}$) for at least one of the wind turbines based at least on the available reactive power of the wind farm ($Q_{avail,WF}$) and the setpoint for the reactive power for the wind farm ($Q_{SP,WF}$) is performed by said wind farm controller, and said distributing at least one of the required increase of the reactive power ($\Delta Q_{WTj}^{*}$) and the setpoint for the reactive power ($Q_{SP,WTj}$) to each wind turbine controller of the at least one of the wind turbines is performed by said wind farm controller.

12. The control system of claim 9, wherein said determining the setpoint for the reactive power ($Q_{SP,WTj}$) for each of the at least one of the wind turbines based at least on the available reactive power of said each wind turbine ($Q_{avail,WTj}$) and said required increase of the reactive power ($\Delta Q_{WTj}^{*}$) is performed by the wind farm controller.

13. The control system of claim 9, wherein said determining the setpoint for the reactive power ($Q_{SP,WTj}$) for the respective wind turbine based at least on the available reactive power of said respective wind turbine ($Q_{avail,WTj}$) and said required increase of the reactive power ($\Delta Q_{WTj}^{*}$) is performed by individual ones of the wind turbine controllers.

14. The method of claim 1, wherein a required increase of reactive power at the wind farm is broken down to the required increase of reactive power ($\Delta Q_{WTj}^{*}$) via the first fraction.

15. The method of claim 1, wherein the first fraction corresponds to an assignment of the increase of reactive power for individual ones of the plurality (N) of wind turbines.

16. A method for operating a wind farm comprising a plurality (N) of wind turbines, which are operated to supply electrical power to a grid in accordance with at least one setpoint value for a power related electrical variable, the method comprising the steps of:

receiving a setpoint for a reactive power ($Q_{SP,WF}$) to be supplied by the wind farm;

determining a value of an available reactive power ($Q_{avail,WTj}$) of each wind turbine;

determining an available reactive power of the wind farm ($Q_{avail,WF}$) from the sum of the available reactive power of each wind turbine ($Q_{avail,WF}:=\Sigma_{j=1}^{N} Q_{avail,WTj}$);

comparing the available reactive power of the wind farm ($Q_{avail,WF}$) with the received setpoint for the reactive power ($Q_{SP,WF}$) for the wind farm; and, wherein, if the available reactive power of the wind farm ($Q_{avail,WTj}$) is smaller than the received setpoint for the reactive power ($Q_{SP,WF}$) for the wind farm:

determining a required increase of the reactive power ($\Delta Q_{WTj}^{*}$) for at least one of the wind turbines based at least on the available reactive power of the wind farm ($Q_{avail,WF}$) and the setpoint for the reactive power for the wind farm ($Q_{SP,WF}$), wherein a required increase of reactive power for the wind farm is determined as a difference of the setpoint for the reactive power for the wind farm ($Q_{SP,WF}$) and the available reactive power of the wind farm ($Q_{avail,WF}$), and the required increase of reactive power ($\Delta Q_{WTj}^{*}$) of the at least one wind turbine is determined as a first fraction ($g_j$) of said required increase of reactive power for the wind farm:

$$\Delta Q_{WTj}^{*}:=g_j(Q_{SP,WF}-Q_{avail,WF}),$$

wherein the first fraction ($g_j$) of said required increase of reactive power is determined from a sensitivity of the reactive power ($Q_j$) to the active power ($P_j$), wherein the first fraction ($g_j$) is proportional to the sensitivity;

determining a setpoint for the reactive power ($Q_{SP,WTj}$) for each of the at least one of the wind turbines based at least on the available reactive power of said each wind turbine ($Q_{avail,WTj}$) and said required increase of the reactive power ($\Delta Q_{WTj}^*$); and, distributing at least one of the required increase of the reactive power ($\Delta Q_{WTj}^*$) and the setpoint for the reactive power ($Q_{SP,WTj}$) to each of the at least one of the wind turbines.

\* \* \* \* \*